United States Patent [19]

Lothenbach et al.

[11] Patent Number: 4,698,475
[45] Date of Patent: Oct. 6, 1987

[54] MACHINE TOOL PALLET THAT CLAMPS THE WORKPIECE TO THE PALLET

[75] Inventors: Michael Lothenbach, Lucerne; Peter Herzog, Buochs, both of Switzerland

[73] Assignee: AG fur Industrielle Elektronik AGIE, Losone, Switzerland

[21] Appl. No.: 673,703

[22] PCT Filed: Feb. 27, 1984

[86] PCT No.: PCT/CH84/00031
§ 371 Date: Oct. 18, 1984
§ 102(e) Date: Oct. 18, 1984

[87] PCT Pub. No.: WO84/03242
PCT Pub. Date: Aug. 30, 1984

[30] Foreign Application Priority Data
Feb. 28, 1983 [CH] Switzerland ............... 1095/83

[51] Int. Cl.⁴ ................. B23H 7/02; B23Q 3/06; B23Q 3/15
[52] U.S. Cl. ................. 219/69 W; 198/803.01; 204/297 R; 204/297 M; 219/69 R; 269/235
[58] Field of Search .............. 219/69 R, 69 M, 69 W; 29/568; 269/55, 56, 57, 309, 52, 8, 308, 60, 235; 204/297 R, 297 M; 198/653, 655, 656, 803.01, 803.03, 803.04, 803.08, 803.09, 803.14, 803.15, 465.1; 901/30, 31

[56] References Cited

U.S. PATENT DOCUMENTS

| 1,349,632 | 8/1920 | Staley ..................... 269/236 |
| 1,368,683 | 2/1921 | Anderson .................. 269/287 |
| 2,538,851 | 1/1951 | Sniezyk ................... 269/287 |
| 3,754,667 | 8/1973 | Storch .................... 198/653 |
| 4,159,762 | 7/1979 | Bulwith ................... 198/653 |
| 4,217,978 | 8/1980 | Stalker ................... 198/465.1 |
| 4,373,840 | 2/1983 | Miller, Jr. ............... 198/465.1 |
| 4,399,988 | 8/1983 | De Shong ................. 269/8 |
| 4,402,393 | 9/1983 | Kent ...................... 198/803.01 |
| 4,416,577 | 11/1983 | Inaba et al. .............. 29/568 |
| 4,480,738 | 11/1984 | Mattson ................... 198/465.1 |
| 4,484,052 | 11/1984 | Inoue ..................... 219/69 M |
| 4,494,456 | 1/1985 | Pink ...................... 198/803.01 |
| 4,518,076 | 5/1985 | Feisel et al. ............. 198/648 |
| 4,518,155 | 5/1985 | Lehmann ................... 269/60 |
| 4,520,919 | 6/1985 | Keitaro ................... 198/803.01 |
| 4,557,371 | 12/1985 | Yonezawa .................. 198/803.01 |

FOREIGN PATENT DOCUMENTS

| 3127495 | 5/1982 | Fed. Rep. of Germany . |
| 148194 | 5/1981 | German Democratic Rep. ............ 269/309 |
| 119362 | 9/1981 | Japan ............ 269/57 |
| 194846 | 11/1982 | Japan ............ 269/56 |
| 205039 | 12/1982 | Japan ............ 269/56 |
| 631101 | 7/1982 | Switzerland ............ 269/57 |
| 2078563A | 1/1982 | United Kingdom ............ 269/58 |
| 456390 | 2/1975 | U.S.S.R. ............ 198/656 |

OTHER PUBLICATIONS

"Centering Fixture", Wilke, IBM Technical Disclosure Bulletin, vol. 12, No. 6, Nov. 1969, pp. 837 and 838.

Primary Examiner—A. D. Pellinen
Assistant Examiner—Geoffrey S. Evans
Attorney, Agent, or Firm—Neuman, Williams Anderson & Olson

[57] ABSTRACT

A workpiece pallet suitable for fixing and transferring workpieces on machine tools is provided with direction-bound guidance on transfer holders. The transfer holders cooperate with a workpiece loading mechanism. The direction-bound guidance devices are located outside the working range of the fixed workpiece or outside the working range of the machining tools belonging to the machine tool. This ensures an all-round accessibility to the fixed workpiece during machining. With the aid of a quick-clamping device, the pallet can be rapidly and precisely used on the machine tool, independently of the workpiece clamping insert. Even in the case of the mass production of items, it is possible to maintain a particularly high precision in the reproduced position of the workpieces and consequently in the machining quality. The pallet can additionally be provided with a controllable waste piece locking system.

18 Claims, 5 Drawing Figures

MACHINE TOOL PALLET THAT CLAMPS THE WORKPIECE TO THE PALLET

The invention relates to a workpiece pallet for fixing and transferring workpieces on machine tools, particularly spark-eroding cutting plants.

In conjunction with the large-scale machining of workpieces on machine tools, it is known to use gripping pallets and this practice is widely used. Generally such pellets are in the form of table-like plates with flutes, which are equipped on their lower bearing side with conveying, positioning and fixing means. The gripping pallets generally make it possible to reduce loading work and consequently the preparation time, particularly if the workpieces have to be guided over several working stations. Gripping pallets also reduce the idle times, because during the working of the workpiece on one pallet, a new workpiece can be fixed and/or prepared on another pallet. Special difficulties occur when using such known workpiece pallets on spark-eroding cutting plants. In such cutting plants, which have a path-controlled, continuous wire electrode, for example, randomly shaped prismatic workpieces can be produced. The workpiece is either cut from a larger piece of material, or conversely the surrounding outer shape represents the workpiece and the inner part is cut away as blanking waste. The operating sequences on such cutting plants are largely automated, so that they are eminently suitable for the large-scale machining of workpieces. The use of workpiece pallets on such machines makes it necessary for the pallet to be automatically loadable on the machine. While maintaining positioning precisions which satisfy the high precision requirements of tool construction and particularly the close tolerances which can be obtained with spark-eroding cutting plants. In addition, there is the difficulty that during spark-eroding cutting, the workpiece must be fixed yet freely accessible to the continuously transiting cutting wire. These requirements are not fulfilled by known workpiece pallets. In many cases, the workpiece must be changed manually after each machining stage. In this case, the alignment of the workpiece is also left to the operating personnel.

DOS No. 3127 495 discloses a pallet for transferring and storing workpieces, particularly for automatic workpiece loading means, and comprises an elongated basic body. The latter contains inserts with openings for the workpieces and a guide slot running in the longitudinal direction of the body. This guide slot cooperates with a guide rail in the workpiece loading means. The decisive disadvantage of this device is that the guide slot intersects the machining range of the workpiece or the action range of the tools on the machine tool, so that free access, particularly from below to the workpiece, is not ensured.

The problem addressed of the present invention is to provide a workpiece pallet which meets fine machining tolerances on machine tools, particularly spark-eroding cutting plants, and which also permits the handling of workpieces, together with their orderly loading and unloading for automatic machining on machine tools. In addition, the trouble-free removal of machining waste is desired.

This problem is solved by the present invention which provides a workpiece pallet for fixing and transferring workpieces in a wire-cutting spark erosion machine where the pallet includes a frame having an insert means for clamping the workpiece in the working zone of the machine, a quick-clamping device for securing the pallet with respect to the machine, and a transfer holder adapted to be coupled with an external transfer mechanism for transferring the pallet to and from the machine, the quick-clamping device and the transfer holder being located outside of the working zone to facilitate the uninterrupted machining of the workpiece. This measure on the one hand solves the aforementioned problem in a particularly effective manner and with simple means on the other hand ensures free access to either side of the workpiece, which is very advantageous particularly for the completely satisfactory supply and removal of the wire electrode in spark-eroding cutting plants.

BRIEF DESCRIPTION OF THE DRAWINGS

Embodiments of the invention are described hereinafter relative to the drawings in which.

DETAILED DESCRIPTION OF THE PREFERRED EMBODIMENTS

Figure 1:
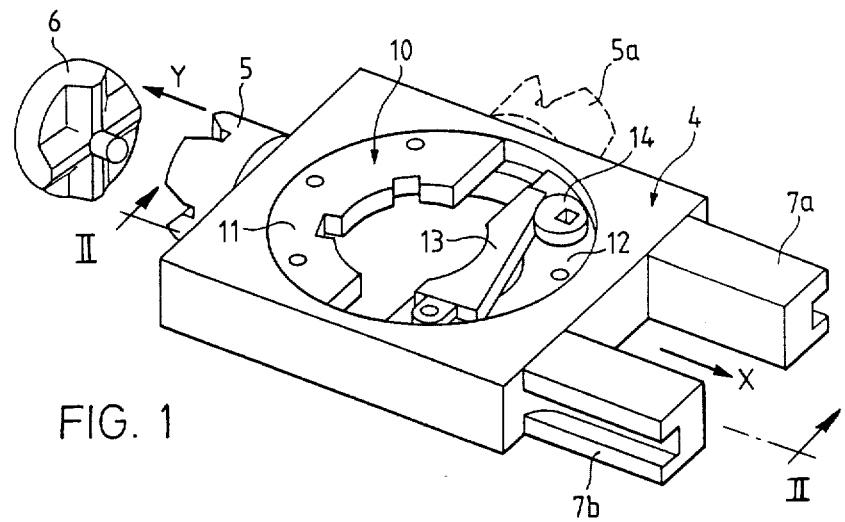
FIG. 1 shows a workpiece pallet according to the invention with a clamping device for workpieces and a frame surrounding the workpiece.
Figure 2:
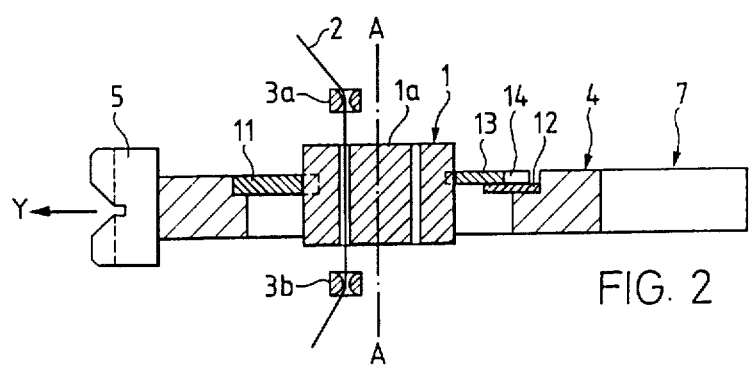
FIG. 2 shows section II—II of FIG. 1 with an inserted workpiece on a spark-eroding cutting plant.

The first embodiment represented in FIGS. 1 and 2 is used for receiving a workpiece 1, which is to be worked or machined in a spark-eroding cutting plant. FIG. 2 shows the wire electrode 2, as well as the wire guidance means 3a, 3b belonging to the cutting plant not shown and which guide shown working or machining means with respect to the workpiece to be worked or machined. The workpiece 1 is fixed in a pallet, which comprises a pallet frame 4 surrounding the workpiece. Pallet frame 4 has a precision clamping piece 5, through which the pallet frame 4 is received on the machine tool in the direction Y. For this purpose a clamping device 6 is provided, which in the represented embodiment is provided with double prismatic clamping surfaces and which can be automatically operated. Such precise clamping means are conventionally used, particularly in conjunction with spark-eroding machine tools. In the particular case of the spark-eroding cutting plant, no noteworthy forces are exerted on the workpiece during the machining process. The indicated clamping devices have a high positioning precision and for the aforementioned reason do not have to absorb particularly high forces. Their strength must be mainly directed at the weights of the pallet and workpiece involved. The precision clamping piece 5 can be fitted to the pallet frame 4 in a random position.

There are three surfaces 7 which, in the represented embodiment, are constructed as two webs 7a, 7b that are provided with slots on a second lateral face of the pallet frame 4 and extend preferably in a transfer direction X at right angles to axis A—A of the clamping opening for a workpiece 1 within pallet frame 4. The free ends of the webs 7a, 7b have frontal stop faces. The gripping faces 7 serve as clamping members for a not shown change arm or a not shown robot means for connection at the time of replacing the pallet on the machine tool. The gripping surfaces 7 as shown do not form a positive connection with the external gripping members. It is also possible to provide positive locking devices. Thus, a pallet change is possible in random pivotal movements and also in a suspended manner with respect to the machine space.

A gripping insert 10 is placed within an opening in the pallet frame 4 in which the workpiece 1 to be worked is intended to be placed. The clamping insert 10 is preferably made from a wear-resistant material. Its shape largely corresponds to the external shape of the workpiece to be worked in consideration of any special cmaping requirements for the workpiece. The clamping insert 10 has a stop 11 and also a counter-stop 12, this being adjustable with respect to stop 11 by means of a clamp clip 13 with the aid of a rotary cam 14. The workpiece is accurately aligned within the pallet frame 4 by means of this device.

In a particularly advantageous manner, the precise shape of the stop 11 within the clamping insert 10 can be obtained on a spark-eroding cutting plant prior to the insertion of a workpiece 1. To avoid the addition of various manufacturing tolerances of assembled parts, the stop 11 can be manufactured with a very high precision with an almost random geometrical configuration. Clamping inserts 10, comprising the stop 11 and the counter-stop 12 can be economically stored in large numbers as standard, and not yet definitively shaped plates. As a result of the machining of these clamping inserts in accordance with the particular clamping contours of the workpieces to be worked, an inexpensive and particularly flexible pallet means is obtained.

The sectional representation of FIG. 2 shows the pallet frame held on the precision clamping piece 5, and in its bore axis A—A is placed the workpiece 1 with the waste piece 1a to be cut out.

In the represented embodiment the working of the workpiece takes place by means of wire electrode 2, which is guided by the guidance means 3a, 3b of the machine tool relative to the fixed workpiece. Workpiece 1 is precisely fixed within the pallet frame 4 by the clamping insert, comprising stop 11 and counterstop 12, as well as by clamp clip 13 and rotary cam 14.

Figure 3:
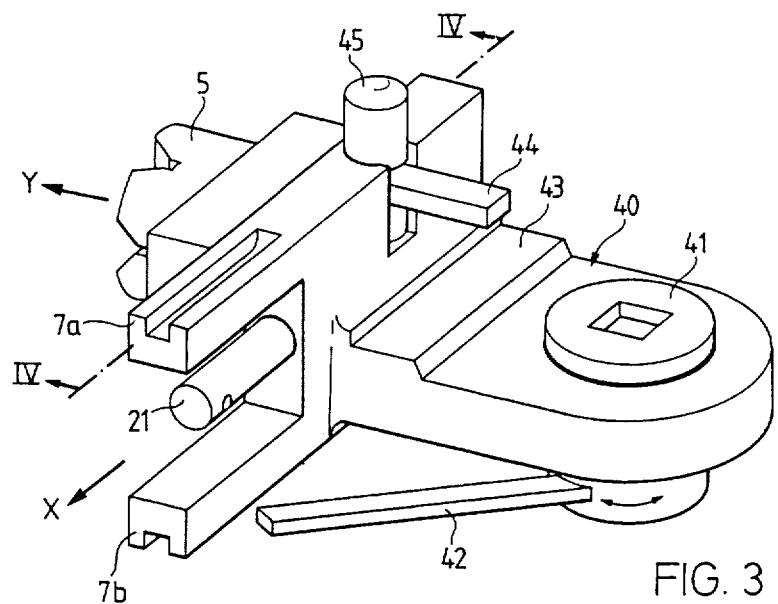
FIG. 3 shows a workpiece pallet according to the invention with clamping means for clamping the inner part of the workpiece.
Figure 4:
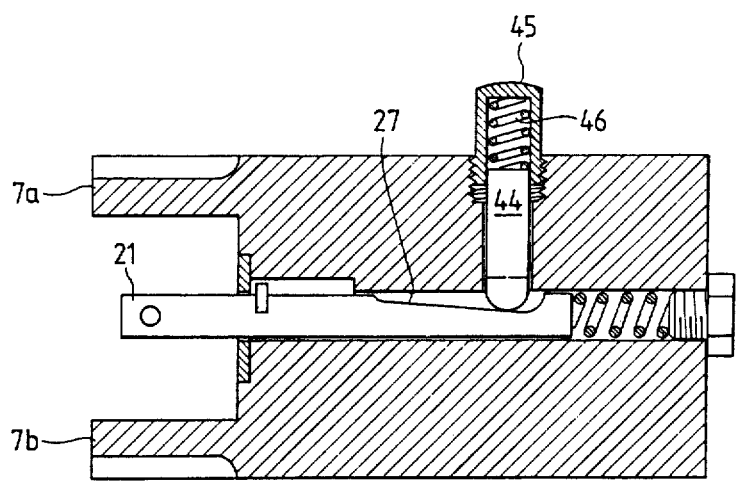
FIG. 4 shows section IV—IV of FIG. 3.

The second embodiment for a workpiece pallet shown in FIGS. 3 and 4 is suitable for the fixing of workpieces which cannot be secured from the outside and in which the inner part represents the machining result and the outer part of the workpiece constitutes the waste. In this embodiment the mounting support is a support arm 40, which is once again connected to a machine tool by means of a precision clamping piece 5. The mounting support is supplied or removed through the use of gripping surfaces 7 by a not shown loading arm or robot. The external dimensions of the workpiece blank determine the dimensions of the support arm which, in its furthest forward area carries a rotary flange 41, which is mounted in the arm. The workpiece is fixed to the flange 41. Fixing can take place by screwing or adhesion. Below support arm 40, flange 41 is provided with a locked rotation means not shown in the drawings and which is operated, for example by means of a lever 42. Apart from being secured to the flange 41 during machining the workpiece is also fixed to a clamping surface 43 at the same level with the aid of a dog 44. The dog 44 is advanced by a spring 46 located in a spring pocket 45. Rotary flange 41 is centrally provided with an opening through which the workpiece blanks can be centrally secured from below through the lockable rotation means and in which a central, angular orientation for the workpiece is possible.

As a result of the spatial extension of the support arm 40 no closed machining path can be performed in one operation in this clamping mode. Thus, in a first phase the profile circumference on the workpiece is machined to the maximum extent possible and as far as is allowed by the spatial extension of the wire guidance means, without colliding with the support arm 40. Then, as described in conjunction with FIG. 4, by further insertion of the loading arm (not shown), a slide 21 is operated which, through a tapered surface 27, raises the dog 44 against the spring 46 and consequently eliminates the clamping of the worked workpiece.

By means of lever 42, which is also operated by the loading arm and the latch means connected thereto, the flange 41 can now be rotated together with the workpiece fixed thereto. The lever 42 is operated until the workpiece contour cut in the first machining phase comes to rest over the support arm and the remaining residual contour is located in the action range of the cutting plant. Following the pivoting away of the loading arm, dog 44 again secures the outer part of the workpiece. Cutting is optionally resumed from a new starting bore and is continued until the desired contour has been completely cut. The outer part of the workpiece is reliably held by dog 44, even after being completely cut away.

If the contour along which the cut on the workpiece is to be made constitutes a closed curve, necessarily part of the workpiece becomes waste. The waste piece can tilt after release and can jam the cutting wire, which could lead to a break in the wire. However, the waste piece can also drop down and consequently jam other machine parts or impede the function of the machine, particularly if the latter remains unsupervised for a long time. To prevent uncontrolled jamming or dropping down of the wastepiece, the workpiece pallet is additionally provided with a workpiece locking means according to FIG. 5.

Figure 5:
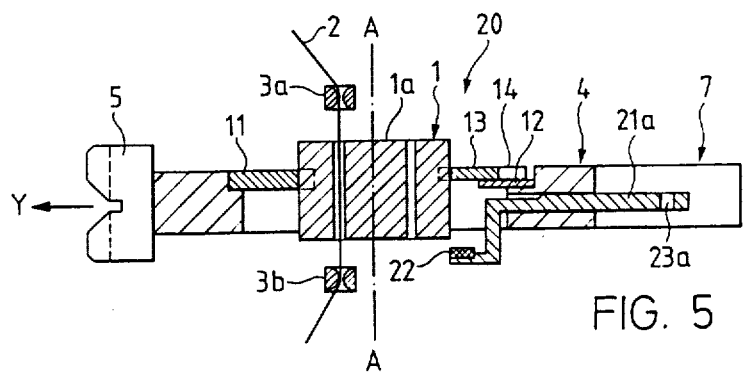
FIG. 5 shows the workpiece pallet according to FIGS. 1 and 2 with an additional waste piece locking system.

According to FIG. 5, a workpiece locking means 20 is provided with a lateral slide 21a in the pallet frame 4. The slide 21a can be brought into the area below the workpiece 1, the part of slide 21a extending furthest below the workpiece being equipped with a magnet 22. The slide 21a can be operated by a loading arm or a robot arm connected to the pallet when the waste piece threatens to drop. Operation can take place with the aid of known pneumatic, hydraulic or electrical means from the connected loading arm or robot arm and through a coupling 23a. Preferably the control system for the cutting process is designed in such a way that the start and finish of the cutting curve faces the slide 21a on the pallet fame 4. Thus, the waste piece is very effectively held, generally in a symmetrical manner. Preferably the magnet 22 is made from electrically conductive material, so that the magnet bridging the intersection point simultaneously constitutes an electrical bridge between the waste piece and the remainder of the workpiece, which leads to a particularly uniform cut. After releasing the workpiece pallet from the machine tool, the slide 21a is drawn back to a suitable point again by a controlled movement. The waste piece then drops at the desired point without causing any damage or interference with machining. In place of the single slide 21a described, it is also possible to provide several slides with magnets 22, or a single slide with several individual magnets.

We claim:

1. In a wire-cutting spark erosion machine system having a wire or strip-like machining tool and tool guidance means for producing an operative connection with parts of the spark erosion machine system and defining a working zone for the machining of a workpiece, a workpiece pallet comprising a pallet frame, including insert means for clamping the workpiece in the working zone; a quick-clamping device for securing the pallet with respect to the machine; a transfer holder for coupling with an external transfer mechanism for transferring the workpiece pallet; said quick-clamping device and transfer holder means being located substantially outside of said working zone to facilitate the uninterrupted machining of the workpiece.

2. A workpiece pallet according to claim 1 wherein the insert means is removable and consists of one of a set of clamping inserts of various configurations corresponding to different shapes of the workpiece.

3. A workpiece pallet according to claim 1 wherein the insert means comprises a support mounted for rotation in a plane substantially perpendicular to the machine tool and a means for locking a workpiece carried on the support at a selected angular position.

4. In a wire-cutting spark erosion machine system having a wire or strip-like machining tool, a workpiece pallet comprising a pallet frame including means for operatively securing the pallet with respect to the machine and means for coupling the pallet with an external transfer mechanism for transferring the pallet to and from the machine, the pallet frame having an opening formed in it; means disposed in the opening for holding a workpiece during machining, including a stop, a movable clip associated with the stop for clamping the workpiece between the stop and the clip and means for operating the clip to place it in a clamping position; the securing means and the coupling means being attached to different surfaces of the pallet frame in approximately the plane of the opening.

5. A workpiece pallet according to claim 4 wherein the pallet frame includes a circumferential support shoulder around the opening on which is mounted the workpiece holding means.

6. A workpiece pallet according to claim 4 wherein the means for operating the clip is formed as a cam that is mounted for rotation in the holding means and adapted for moving the clip into the clamping position when the cam is rotated.

7. A workpiece pallet according to claim 4 wherein the clip is formed as a lever pivotably mounted at one end to the holding means, and the operating means acts upon the free end of the lever.

8. A workpiece pallet according to claim 4 wherein the surfaces of the stop and the clip that hold the workpiece are formed generally in accordance with the shape of the workpiece to be machined.

9. A workpiece pallet according to claim 4 wherein the holding means does not protrude from the opening in the pallet frame.

10. A workpiece pallet according to claim 4 wherein the holding means further comprises a counterstop on which is mounted the clamping clip and the operating means.

11. A workpiece pallet according to claim 4 wherein the securing means comprises mated clamping members having double prismatic clamping surfaces.

12. A workpiece according to claim 4 wherein the coupling means comprises a pair of protruding web members having guidance slots formed in corresponding surfaces thereof adapted to be engaged by the external transfer mechanism.

13. A workpiece pallet according to claim 4 further comprising a controllable means associated with the pallet frame for supporting a workpiece part that has been cut from the workpiece held by the holding means.

14. In a wire-cutting spark erosion machine system having a wire or strip-like machining tool, a workpiece pallet comprising a frame including means for operatively securing the pallet with respect to the machine and means for coupling the pallet with an external transfer mechanism for transferring the pallet to and from the machine; a support arm connected to the frame and including a rotatable flange on which is mounted a means for clamping the workpiece in a fixed rotational position with respect to the support arm during machining.

15. A workpiece pallet in accordance with claim 14 wherein the clamping means comprises a dog member and a surface of the support arm, between which is clamped the workpiece during machining.

16. A workpiece pallet in accordance with claim 14 wherein the rotatable flange has formed in it an opening through which the workpiece can be secured to the flange and the rotatable flange includes a lever for angular positioning of the flange.

17. A workpiece pallet in accordance with claim 15 wherein the frame includes means for positioning the dog member in a spaced relation with the corresponding clamping surface.

18. A workpiece pallet in accordance with claim 17 wherein the positioning means includes a means for biasing the dog member toward the corresponding clamping surface of the support arm, and the coupling means includes a slide member having a rest position and an actuating position wherein the dog member biasing means is disabled, thereby unclamping the dog member from the workpiece.

* * * * *

UNITED STATES PATENT AND TRADEMARK OFFICE
CERTIFICATE OF CORRECTION

PATENT NO.   :   4,698,475
DATED        :   October 6, 1987
INVENTOR(S)  :   Michael Lothenbach and Peter Herzog It is certified that error appears in the above-identified patent and that said Letters Patent is hereby corrected as shown below:

In the Abstract, line 3, after "guidance", add the word
--devices--.

In Column 1, line 11, change "pellets" to --pallets--.

In Column 1, line 33, after "machine", delete ". While" and
insert --, while--.

In Column 1, line 57, after "addressed", delete "of" and
insert --by--.

In Column 3, line 30, delete "and" and insert --but--.
In Column 4, line 19, after "arm" add --,--.
In Column 5, line 26, delete "tool".

In Column 2, line 40, after "guide" delete "shown" and
insert --the--.

In Column 3, line 15, change "cmaping" to --clamping--.

Signed and Sealed this

Fourteenth Day of June, 1988

Attest:

DONALD J. QUIGG

Attesting Officer    Commissioner of Patents and Trademarks